Figures 1, 3:
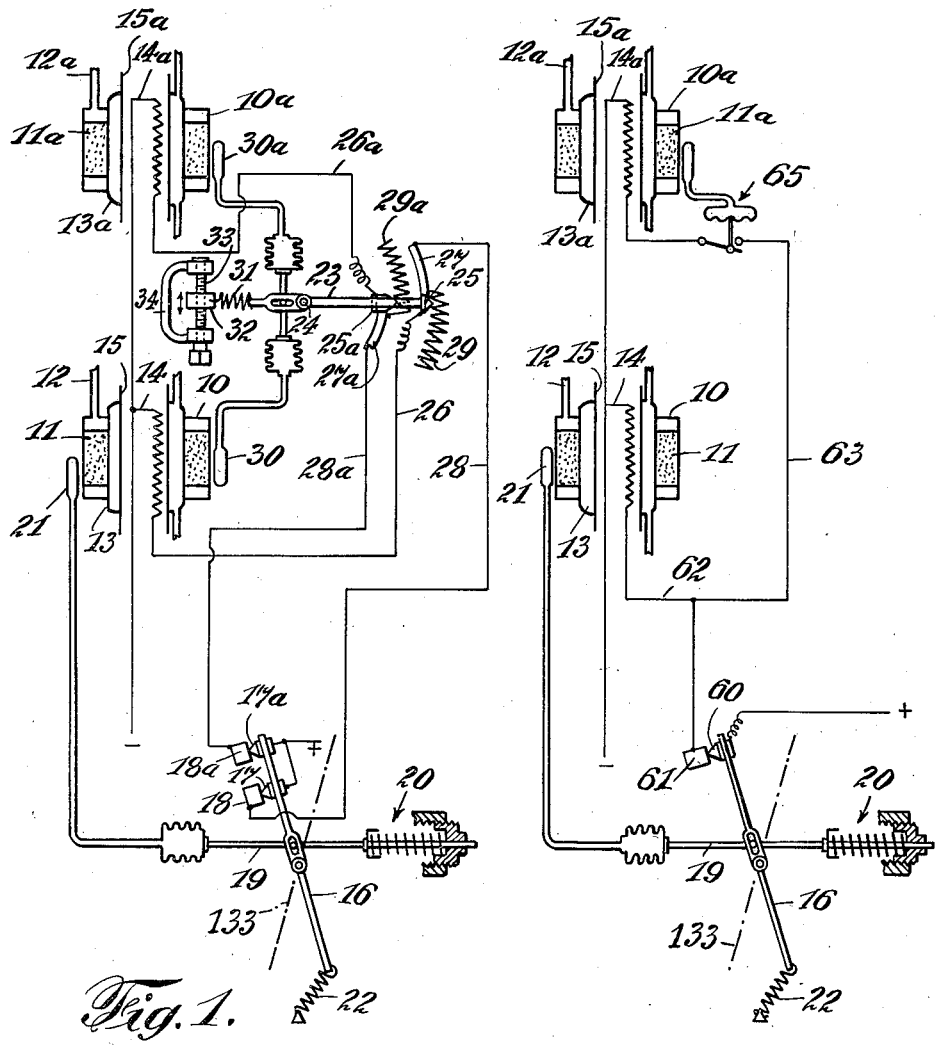

June 5, 1945. N. ERLAND AF KLEEN 2,377,332
ABSORPTION REFRIGERATING APPARATUS
Filed May 15, 1941 2 Sheets-Sheet 1

INVENTOR.
Nils Erland af Kleen
BY C. P. Goepel
his ATTORNEY

Patented June 5, 1945

2,377,332

UNITED STATES PATENT OFFICE 2,377,332

ABSORPTION REFRIGERATING APPARATUS

Nils Erland af Kleen, Stockholm, Sweden, assignor to Kleen Refrigerator, Inc., Hoboken, N. J., a corporation of Delaware Application May 15, 1941, Serial No. 393,599

15 Claims. (Cl. 62—5)

This invention relates to new and useful improvements in absorption refrigerating apparatus and is directed more particularly to a thermostat arrangement for controlling the amount of heat required in the operation of such apparatus.

Thermostat devices have heretofore been employed in connection with absorption refrigerating apparatus of the intermittent type, for example, to control the operation of a single intermittent unit or a plurality of intermittent units operating in alternate phase relation to one another. However, for a plurality of boiler absorbers employed in a single intermittent unit, or in a plurality of intermittent units operating in the same phase relation to one another to maintain the necessary amount of refrigerant in circulation, it is not possible with the thermostat devices heretofore known to accurately control the operation of such unit or units.

It is therefore the primary object of the present invention to provide a thermostat control for a plurality of boiler absorbers, either of a single intermittent unit, or of separate intermittent units operating together as a group.

For example, in certain installations, a plurality of boiler absorbers in a single intermittent unit or in separate intermittent units are adapted to be heated simultaneously and at the same rate of heat input, or respectively different amounts of heat are supplied simultaneously to a plurality of boiler absorbers but at a uniform rate of input for all boiler absorbers, and it is therefore another object of the present invention to provide a thermostat arrangement which not only controls the operation of a single intermittent unit, or a plurality of intermittent units from one phase to the other, but also regulates the heat input to the several boiler absorbers.

In other installations, each intermittent unit has a plurality of connected boiler absorbers adapted to be cooled by a common cooling system. In such installations, the amount of heat required for one boiler absorber might not coincide with that required for another boiler absorber, or if the same amount is required for each boiler absorber, the heating of one might not coincide with that of another. However, inasmuch as a common cooling system is utilized for the plurality of boiler absorbers, it becomes necessary to shift the operation of the unit from the generating phase to the absorbing phase only when each boiler absorber has been supplied with the required amount of heat. It is therefore a further object of the invention to provide a thermostat arrangement for individually controlling the heat input to a plurality of boiler absorbers in an absorption unit and for controlling the operation of the unit from one phase to the other.

In still other installations, a plurality of boiler absorbers in a single intermittent unit, or in separate intermittent units, are adapted to be heated simultaneously and require the same amount of heat, but the heating means employed might raise the temperature in one boiler absorber more rapidly than in another and in order to prevent overheating of the same, and yet to maintain the predetermined temperature substantially constant, it becomes necessary to intermittently shut off the supply of heat to one boiler absorber while the other continues to be heated. It is therefore still another object of the invention to provide a thermostat arrangement to control not only the operation from one phase to the other of a single intermittent unit embodying a plurality of boiler absorbers, or of a plurality of intermittent units operating in the same phase relation to one another, but also to intermittently control the heat input to some of the boiler absorbers.

With the above and other objects in view which will appear as the description proceeds, the invention consists in the novel features hereinafter more fully set forth in the following description, illustrated by way of example in the accompanying drawings, and more particularly pointed out in the appended claims.

Figure 4:
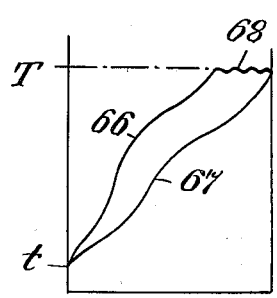
Figure 2:
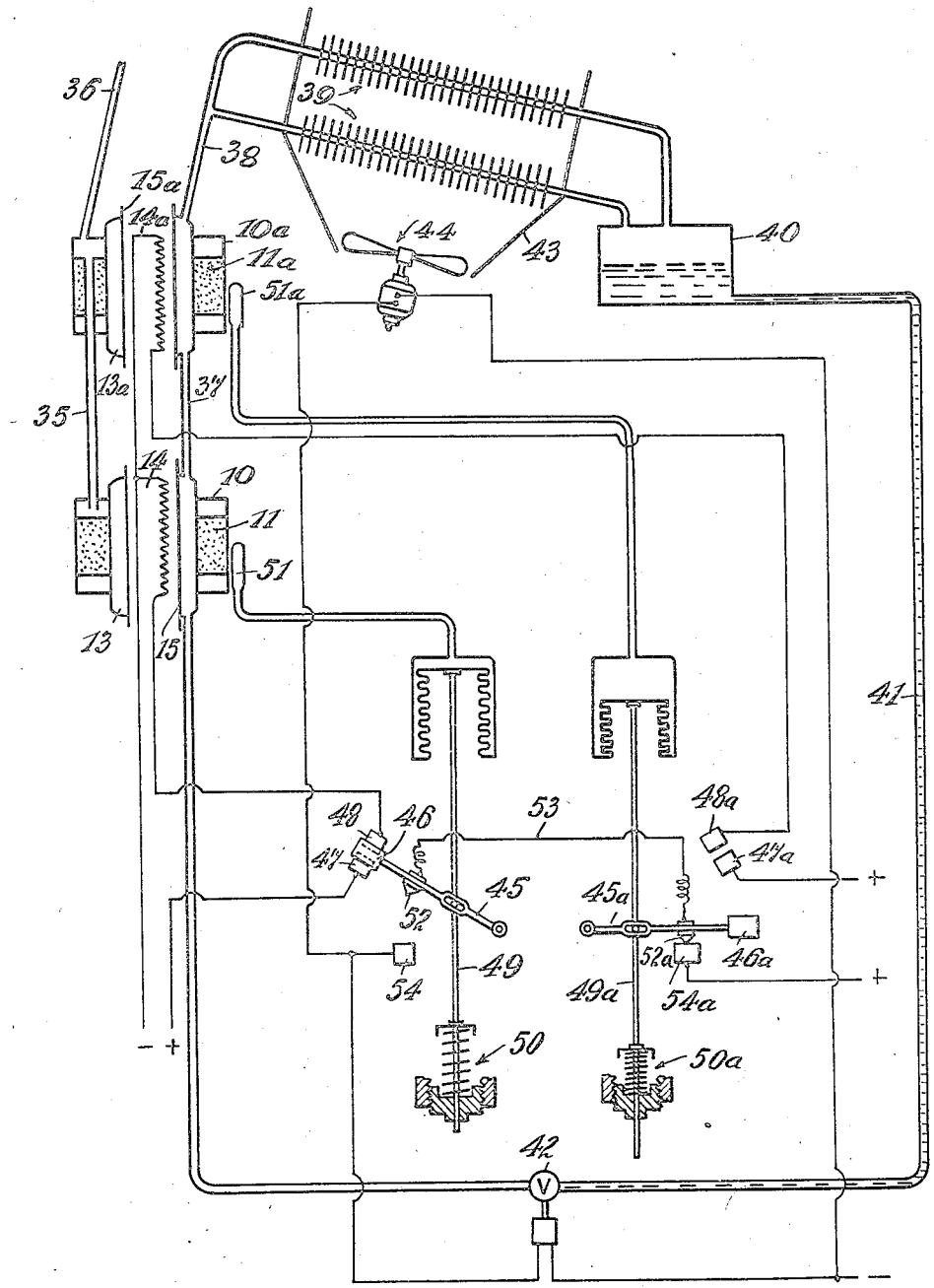

Referring to the drawings in which numerals of like character designate similar parts throughout the several views, Fig. 1 is a diagrammatic view of one form of thermostat control in accordance with the present invention for an intermittent absorption refrigerating installation embodying a plurality of boiler absorbers adapted to be heated simultaneously and at the same rate of heat input;

Fig. 2 is a similar view of a different form of thermostat control in accordance with the invention for an intermittent type absorption refrigerating installation embodying a plurality of boiler absorbers in a single intermittent unit adapted to be cooled by a common secondary cooling system;

Fig. 3 is a similar view of another form of thermostat control for an intermittent type absorption refrigerating installation embodying a plurality of boiler absorbers adapted to be heated simultaneously, and requiring the same amount of heat, but wherein the heating means heats one boiler absorber more rapidly than another, and Fig. 4 is a temperature chart illustrating the operation of the thermostat control of Fig. 3.

In the drawings, referring first to Fig. 1, two vessels or boiler-absorbers 10 and 10a are shown charged with suitable solid absorbent material 11 and 11a, respectively. The boiler-absorbers may form parts of separate intermittent type absorption refrigerating systems or units operating together on alternate generating and absorbing periods, or the two boiler-absorbers may form parts of a single intermittent type absorption refrigerating system or unit having alternate generating and absorbing periods. In either case, the two boiler-absorbers 10 and 10a are heated simultaneously during the generating periods to drive out refrigerant vapors from the solid absorbent 11 and 11a into pipes 12 and 12a, respectively, to the condensing and evaporating parts of the refrigerating apparatus (not shown). The boiler absorbers are cooled simultaneously during the absorbing periods by any suitable means, such for example as the cooling chambers 13 and 13a, respectively, of separate secondary cooling systems, or of a common secondary cooling system, through which system or systems a volatile medium is circulated in heat exchange relation with the boiler absorbers 10 and 10a to permit the re-absorption of the refrigerant by the absorbent.

For convenience, an electrical system is illustrated for heating the boiler absorbers and consists of elements 14 and 14a arranged inside separate flues 15 and 15a provided centrally of the respective boiler absorbers 10 and 10a and adapted to be energized from a suitable source of current. The circuit to the heating elements 14 and 14a is controlled by a thermostat switch comprising pivoted lever 16 carrying a pair of contacts 17, 17a connected to the positive line of the source of current and adapted to cooperate with a pair of fixed contacts 18, 18a adjacent one side of the pivoted lever. A transverse rod 19, movable in one direction by means of spring loading device 20, is operatively connected to the pivoted lever 16 to shift the latter on its pivot into circuit-making position, said rod being movable in the opposite direction, to shift the lever 16 into circuit-breaking position, by a fluid pressure system 21 responsive to the temperature in boiler absorber 10. A snap spring 22 cooperates with one end of the switch lever 16 to yieldably maintain the latter in either one of its aforesaid operating positions.

The heating elements 14 and 14a are adapted to be energized at the same rate and for this purpose I provide an automatic regulating device comprising a lever 23 fulcrumed intermediate its ends as at 24 and carrying a pair of contacts 25 and 25a longitudinally spaced from one another, the former electrically connected by current carrying line 26 to heating element 14 and the latter similarly connected to heating element 14a by line 26a. Contact 25 is adapted to cooperate with a segment 27, connected at one end to contact 18 by current carrying line 28, and with a resistance coil 29 connected to the opposite end of the segment 27. The second contact 25a on the lever 23 is adapted to cooperate with a separate segment 27a connected at one end to contact 18a by line 28a, and with a separate resistance coil 29a connected to the opposite end of the segment 27a.

A fluid pressure system 30 responsive to the temperature in boiler absorber 10, cooperates with one side of the lever 23 to rock the latter on its fulcrum in one direction, while a second fluid pressure system 30a responsive to the temperature in boiler absorber 10a cooperates with the opposite side of the lever to rock the same in the opposite direction.

The segments 27, 27a and the reistance coils 29, 29a are oppositely disposed with respect to one another on each side of the lever 23 so that when the latter is rocked in one direction, for example, clockwise, contact 25 will be moved across resistance coil 29, while contact 25a will be moved across segment 27a. On the other hand, when lever 23 is rocked in a counterclockwise direction, contact 25 will be moved across segment 27, while contact 25a will be moved across resistance coil 29a.

The lever 23 is preferably spring loaded by means of a coil spring 31, the loading pressure of which is adjustable by a threaded nut 32 movable along a transverse threaded bolt 33 rotatably supported at its opposite ends in a stationary yoke 34, to counteract any differences between the fluid pressure systems 30 and 30a.

Having thus described one form of control device, its operation is as follows:

With pivoted switch lever 16 and fulcrumed lever 23 occupying the positions shown in Fig. 1, the heating elements 14 and 14a are both energized at the same maximum rates and will continue to be so energized as long as the amount of heat input or the rate of heat is the same to each boiler absorber 10 and 10a. When the predetermined temperature is reached, the fluid pressure system 21 will shift the pivoted lever 16 to its circuit-braking position indicated by dot-and-dash line 133, in which position, the valve or valves (not shown) of the secondary cooling system or systems will be opened to permit the necessary cooling for the absorbing phase operation.

In the event the temperature rises more rapidly in one boiler absorber, for example in boiler absorber 10, than in the other boiler absorber 10a, or the heating element 14 is energized at a faster rate than element 14a, fluid pressure system 30 will overcome the pressure in system 30a to swing fulcrumed lever 23 in a clockwise direction, moving contact 25a across segment 27a to energize heating element 14a at the same maximum rate, and moving contact 25 across resistance coil 29 to reduce the rate of energization of heating element 14. As the temperatures in both boiler absorbers 10 and 10a, or the rate of energization of heating elements 14 and 14a become equalized, the fluid pressure system 30a will gradually restore the lever 23 to its original position.

For a more rapid rise in boiler absorber 10a, or energization of element 14a at a faster rate than element 14, the fulcrumed lever 23 will be swung counterclockwise by fluid pressure system 30a to maintain the same rate of energization of heating element 14 through contact 25 and segment 27, but to reduce the rate of energization of heating element 14a through contact 25a and resistance coil 29a.

Thus, the thermostat arrangement in this form of the invention not only controls the operation of the unit or units from one phase to the other but also regulates the heat input to the plurality of boiler absorbers adapted to be heated simultaneously.

In Fig. 2 boiler absorbers 10 and 10a are connected together by conduit 35 to form a battery or series of combined generating and absorbing elements in a single intermittent unit, adapted to be heated by heating elements 14 and 14a, respectively, the refrigerant vapors generated during such heating passing from boiler absorber 10 to boiler absorber 10a and finally passing through conduit 36 to the condensing and evaporating parts of the primary system (not shown). The cooling jackets 13 and 13a of the boiler absorbers 10 and 10a, respectively, are also connected together by pipe 37 so that both jackets form vaporizing vessels for a volatile medium circulating in a secondary cooling system. The vaporized medium passes through vapor pipe 38 leading from the jacket 13a to a double condenser 39 where the medium is condensed and is delivered to a liquid collecting tank 40 from whence it flows through pipe 41 to the cooling jacket 13. A valve 42 interposed in the pipe 41 and operated by a thermostat device hereinafter described in detail, controls the circulation of volatile medium through the secondary system. The double condenser 39 is preferably arranged in an air duct 43 and a motor-driven fan 44 is employed in the bottom of the air duct to increase the air flow therethrough.

In the installation shown, the circuit to the heating elements 14 and 14a is controlled by a double thermostat arrangement comprising a pair of pivoted arms 45 and 45a carrying a circuit-making member 46 and 46a, respectively, the former adapted to cooperate with a pair of contacts 47 and 48, and the latter adapted to cooperate with a similar pair of contacts 47a and 48a. Contacts 47 and 47a are connected to a suitable source of current while contacts 48 and 48a are electrically connected to the heating elements 14 and 14a, respectively. The arm 45 is adapted to be rocked on its pivot by a rod 49 operatively connected thereto intermediate its ends and normally urged in one direction by a spring loading device 50 to rock the arm 45 into circuit-making position with contacts 47 and 48, said rod being movable in the opposite direction against the loading device by a fluid pressure system 51 responsive to the temperature in boiler absorber 10. Arm 45a is also adapted to be rocked on its pivot to make and break the circuit to the heating element 14a by a separate rod 49a normally urged in one direction by a spring loading device 50a, and in the opposite direction by fluid pressure 51a responsive to the temperature in boiler absorber 10a.

The valve 42 and the motor-driven fan 44 are also adapted to be controlled by the double thermostat arrangement and for this purpose, each pivoted arm 45 and 45a carries a contact member 52 and 52a, respectively, electrically insulated from circuit-making members 46 and 46a, respectively, and connected together by current carrying line 53. The contact members 52 and 52a cooperate with complementary fixed contacts 54 and 54a, respectively, the former electrically connected to the valve 42 and to the motor-driven fan 44, and the latter connected to the source of current.

It will thus be seen that in the event one boiler absorber requires less heat than the other but each heating element supplies the same amount of heat, or if the boiler absorbers each require the same amount of heat but one heating element supplies more heat than the other, or the heating of one boiler absorber does not coincide exactly with that of the other, one of the arms 45 or 45a will be moved to de-energize the corresponding heating element in advance of the other. However, inasmuch as the same secondary cooling system is employed to cool both boiler absorbers, the valve 42 and fan assembly 44 will not be energized until both boiler absorbers have been heated to their respective end point temperatures and the application of heat to both has been terminated.

Thus, the thermostat arrangement just described individually controls the heat input to a plurality of boiler absorbers in a single unit and also controls the operation of the unit from one phase to the other.

In the installation shown in Fig. 3, the two boiler absorbers 10 and 10a employed either in a single unit, or in separate units, are adapted to be heated simultaneously by heating elements 14 and 14a, respectively, for the generation of refrigerant vapors, and cooled by the volatile medium circulating through the cooling jackets 13 and 13a of either a common secondary system or separate systems. As in the case of the installation heretofore described in connection with Fig. 1, the operation of the unit or units from one phase to the other is controlled by a single thermostat device comprising pivoted lever 16, transverse operating rod 19 therefor movable in one direction by spring loading device 20, and in the opposite direction by a fluid pressure system 21 responsive to the temperature in boiler absorber 10. However, in this instance, pivoted lever 16 carries only one contact member 60 connected to the source of current and adapted to cooperate in one position of the lever with a complementary contact 61 electrically connected to both heating elements 14 and 14a by current carrying lines 62 and 63, respectively.

In this installation, although both boiler absorbers 10 and 10a require the same amount of heat, the output of element 14a might be greater than that of element 14. Consequently, boiler absorber 10a will be heated up to its predetermined temperature more rapidly than boiler absorber 10. Therefore, in order to prevent overheating of the boiler absorber 10a and yet to maintain the predetermined temperature substantially constant therein until the boiler absorber 10 has attained the aforesaid predetermined temperature, there is provided a thermostate switch 65 interposed in the line 63 and responsive to the temperature in boiler absorber 14a to intermittently break the circuit to the element 14a. When the boiler absorber 10 reaches the predetermined temperature, lever 16 will be rocked by the fluid pressure system 21 to the position indicated by dot-and-dash line 133 to shift the operation of the unit or units to the absorbing phase by permitting the circulation of a volatile medium through the cooling jackets 13 and 13a.

The operation of the installation just described is clearly illustrated in Fig. 4 wherein $t$ designates the bottom temperature in the boiler absorbers 10 and 10a when the lever 16 will be rocked to its circuit-closing position by the spring loading device 25 to energize heating elements 14 and 14a, and T designates the top temperature in the boiler absorbers when the lever 16 will be rocked to its opposite position by fluid pressure system 21 to deenergize the heating elements and open the valve or valves of the secondary system or systems. During the generating phase, the temperature rise in boiler absorber 10a will follow line 66 while that in boiler absorber 10 will follow line 67, and when the predetermined temperature is reached in boiler absorber 10a, the thermostat 65 will operate to open the circuit intermittently to heating element 14a so that the temperature remains substantially constant as indicated by line 68 until boiler absorber 18 is heated by its heating element 14 to the predetermined temperature.

While I have shown and described the invention in connection with a plurality of boiler absorbers adapted to be heated simultaneously by electrical heating means, it is to be understood that the invention is not to be limited in this respect as it is equally applicable to other heating means utilizing gas or other fluids for supplying the necessary heat to a plurality of boiler absorbers.

From the foregoing, it is believed that the construction, operation and advantages of the invention may be readily understand by those skilled in the art without further description, it being borne in mind that numerous changes may be made in the details thereof without departing from the spirit of the invention as set out in the following claims.

What I claim and desire to secure by Letters Patent is:

1. In absorption refrigerating apparatus of the intermittent type, the combination with a plurality of boiler absorbers adapted to be heated conjointly to a predetermined temperature during the generating phase but at respectively different rates; of a thermostat device responsive to the temperature in the boiler absorber being heated at the minimum rate, for controlling the operation of the apparatus from one phase to the other, and a separate thermostat device responsive to the temperature in the boiler absorber being heated at the maximum rate of heat input and operable at said predetermined temperature to intermittently control the heat input to said last named boiler absorber, to maintain said predetermined temperature substantially constant therein until said first named boiler abosrber is heated to the aforesaid predetermined temperature.

2. Absorption type refrigerating apparatus including a plurality of vessels operating alternately as generators and as absorbers, heating means for each of said vessels, means responsive to the temperature in each of said vessels and cooperating with said heating means during operation of said vessels as generators to vary the heat supply to one relative to the heat supply to another one of said vessels upon temperature rise in one different from that in the other one of said first and second vessels, and means responsive to the temperature in one of said vessels and operating at a predetermined temperature attained in said vessel during operation of the latter as generator to terminate the heat supply to all of said vessels.

3. Absorption type refrigerating apparatus including a plurality of vessels adapted to act alternately as generators and as absorbers, heating means for each of said vessels, and mechanism for automatically controlling the operation of said vessels as generators and as absorbers including means for varying the heat supply to one relative to that to another one of said vessels upon temperature change in one different from that in the other one of said vessels during operation of said vessels as generators, and means for terminating the heat supply to all of said vessels in accordance with the conditions in only one of said vessels.

4. In absorption type refrigerating apparatus including a plurality of vessels operating alternately as generators and as absorbers; the combination of heating means for each of said vessels, means acted upon by changes in conditions in each of said vessels and cooperating with said heating means during operation of said vessels as generators to vary the heat input to one without affecting the heat input to another one of said vessels upon changes in conditions in one different from those in the other one of said vessels, and means acted upon by changes in conditions in one of said vessels and cooperating with said heating means during operation of said vessel as generator to terminate the heat supply to all of said vessels.

5. In absorption type refrigerating apparatus including a plurality of vessels operating alternately as generators and as absorbers; the combination of heating means for each of said vessels, and control mechanism including means acted upon by changes in conditions in each of said vessels and movable to one side of a median plane upon change in conditions in one of said vessels different from another one of said vessels to vary the rate of heat input to said second vessel and movable to the other side of the median plane upon change conditions in the second-named vessel different from said first vessel to vary the rate of heat input to the first-named vessel, and means acted upon by changes in conditions in one of said vessels and operative at a predetermined condition attained in said vessel during operation of the latter as generator to terminate the heat supply to all of said vessels.

6. Absorption type refrigerating apparatus including a plurality of vessels operating alternately as generators and as absorbers, heating means for each of said vessels, control mechanism including a pair of elements, means adapted to cooperate with one of said elements to vary the heat supply to one without affecting the heat supply to another one of said vessels and adapted to cooperate with the other one of said elements to vary the heat supply to said second-named vessel without affecting the heat supply to said first-named vessel, and means responsive to the temperature in each of said vessels and operating upon temperature change in one different from that in the other one of said vessels for actuating said second-named means, and a thermostat device including means responsive to the temperature in one of said vessels and operating at a predetermined temperature attained in said vessel during operation of the latter as generator to terminate the heat supply to said first-named and second-named vessels.

7. Absorption type refrigerating apparatus including a plurality of boiler-absorbers having alternate heating and cooling periods, heating means for said boiler-absorbers, cooling means for said boiler-absorbers, and control mechanism including means acted upon by changes in temperature in one of said boiler-absorbers for automatically controlling the heating and cooling periods of all of said boiler-absorbers, and means acted upon by changes in temperature in each of said boiler-absorbers and operating upon temperature change in one different from that in another one of said boiler-absorbers during each heating period of said boiler-absorbers to vary the heat supply to one relative to the heat supply to the other one of said first and second boiler-absorbers.

8. Absorption type refrigerating apparatus including a plurality of boiler-absorbers having alternate heating and cooling periods, heating means for each of said boiler-absorbers, cooling means common to all of said boiler-absorbers, control means for said cooling means including a valve, an energizing circuit for said valve including a plurality of switches in series, and a control device including a plurality of elements acted upon by temperature change in each of said boiler-absorbers, respectively, and each operating at a predetermined temperature to shut off the heating means of the respective boiler-absorber and close one of said switches.

9. Absorption type refrigerating apparatus including a plurality of boiler-absorbers having alternate heating and cooling periods, heating means for said boiler-absorbers, cooling means for said boiler-absorbers, and control mechanism for operating said heating means and cooling means alternately including means acted upon by changes in temperature in one of said boiler-absorbers and operating at a predetermined temperature attained during each heating period of said boiler-absorber to initiate the cooling period of all of said boiler-absorbers, and means acted upon by changes in temperature in another one of said boiler-absorbers and operating at a predetermined temperature attained in said second boiler-absorber prior to the aforesaid predetermined temperature in said first boiler-absorber to shut off the heating means of said second boiler-absorber without affecting operation of the heating means of said first boiler-absorber.

10. Absorption type refrigerating apparatus including a plurality of boiler-absorbers having alternate heating and cooling periods, heating means for said boiler-absorbers, cooling means for said boiler-absorbers, and control mechanism for operating said heating means and cooling means alternately including means acted upon by changes in temperature in one of said boiler-absorbers and operating at a predetermined temperature attained during each heating period of said boiler-absorber to initiate the cooling period of all of said boiler-absorbers, and means acted upon by changes in temperature in another one of said boiler-absorbers and operating at a predetermined temperature attained in said second boiler-absorber prior to the aforesaid predetermined temperature in said first boiler-absorber to shut off the heating means of said second boiler-absorber without affecting the heating means of said first boiler-absorber and the cooling means of either of said first and second-named boiler-absorbers.

11. Absorption type refrigerating apparatus including a plurality of boiler-absorbers having alternate heating and cooling periods, heating means for each of said boiler-absorbers, cooling means for each of said boiler-absorbers, and means for alternately operating the heating and cooling means of each of said boiler-absorbers constructed and arranged to shut off the heating means of one of said boiler-absorbers without affecting operation of the heating means of another one of said boiler-absorbers and delay operation of the cooling means of said first boiler-absorber until termination of a heating period of said second boiler-absorber.

12. Absorption type refrigerating apparatus including a plurality of vessels operating alternately as generators and as absorbers, heating means for each of said vessels, and control mechanism for said heating means including means acted upon by changes in temperature in one of said vessels and operating at a predetermined temperature attained in said vessel during operation of the latter as generator to interrupt the heat supply of all of said vessels, and means acted upon by changes in temperature in another one of said vessels and operating at a predetermined temperature attained in said vessel prior to the aforesaid predetermined temperature in said first vessel to interrupt the heat supply to said second vessel without affecting the heat supply to said first vessel.

13. Absorption refrigerating apparatus including two boiler-absorbers having alternate heating and cooling periods, heating means for said boiler-absorbers, cooling means for said boiler-absorbers, and control means constructed and arranged to operate said heating means to heat each boiler-absorber to a predetermined end temperature and to prevent operation of said cooling means until both boiler-absorbers have been heated to their respective predetermined end temperatures.

14. Absorption refrigerating apparatus including a pair of boiler absorbers, heating means for each boiler absorber, and control mechanism including thermostatic means responsive to the temperature of each of said boiler absorbers in control of said heating means, said control mechanism being constructed and arranged to initiate application of heat to both of said boiler absorbers simultaneously and to regulate said heating means to heat said boiler absorbers to predetermined end temperatures.

15. Absorption refrigerating apparatus including a pair of boiler absorbers, heating means for each boiler absorber, and control mechanism for said heating means constructed and arranged to initiate application of heat to both of said boiler absorbers simultaneously including thermostatic means responsive to a thermal condition induced as a consequence of the operation of said heating means to regulate the operation of said heating means to heat said boiler absorbers to predetermined end temperatures.

NILS ERLAND AF KLEEN.